Figure 3:
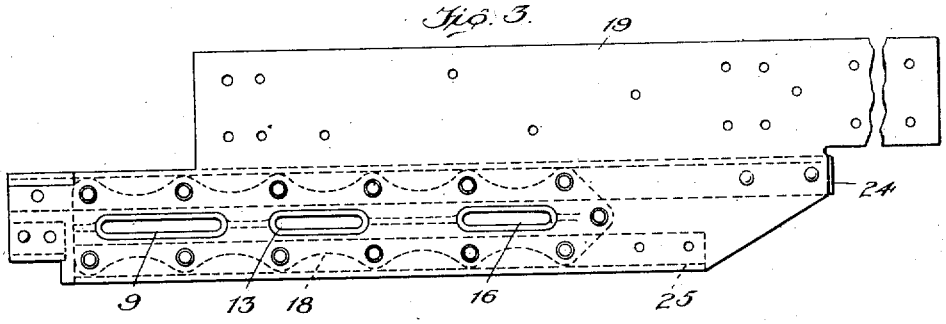

T. H. SYMINGTON.
END CONSTRUCTION.
APPLICATION FILED JAN. 6, 1916.
Reissued Feb. 15, 1916.
14,069.
2 SHEETS—SHEET 1.
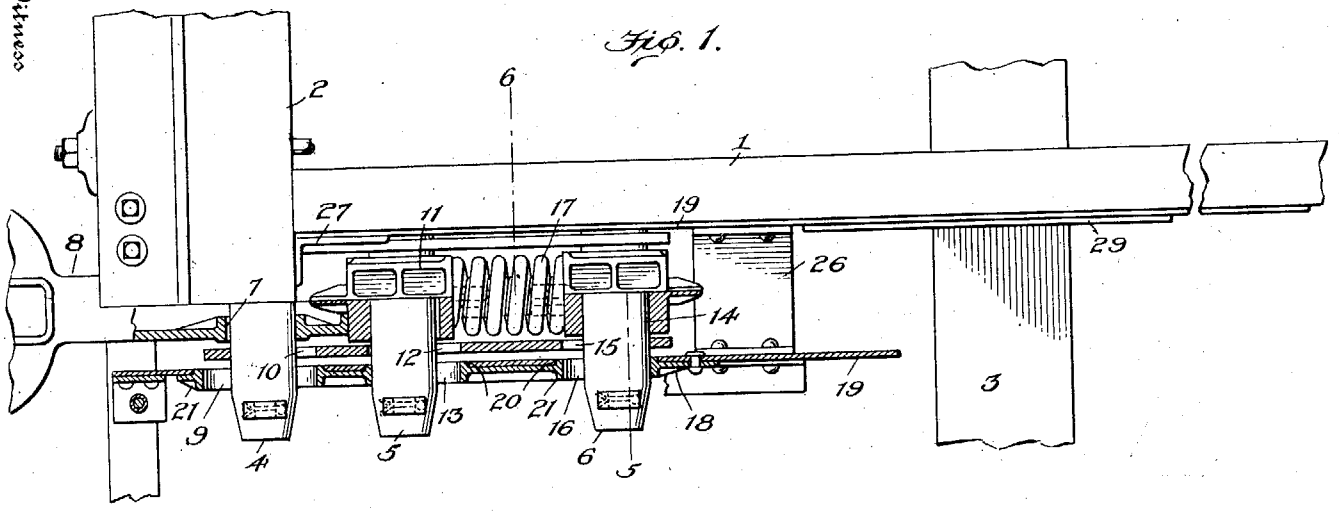
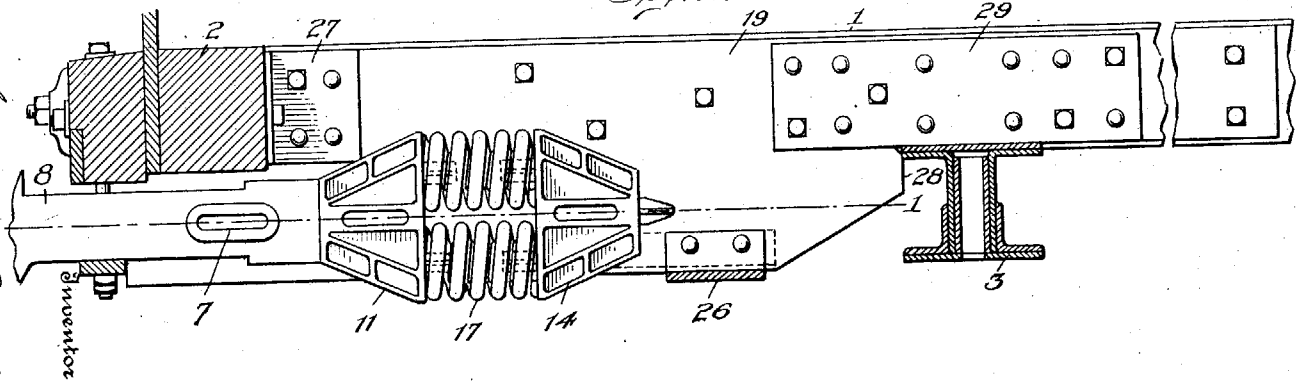
Witness
Edwin L. Bradford
By
Thomas H. Symington,
Inventor
Frank T. P. Meehlin, Attorney

T. H. SYMINGTON.

END CONSTRUCTION.

APPLICATION FILED JAN. 6, 1916.

Reissued Feb. 15, 1916.

14,069.

2 SHEETS—SHEET 2.

Witness

Edwin L Bradford

Inventor

Thomas H. Symington

By

Frank T. Fitzsimmons Attorney

UNITED STATES PATENT OFFICE.

THOMAS H. SYMINGTON, OF ROCHESTER, NEW YORK.

END CONSTRUCTION.

14,069. Specification of Reissued Letters Patent. Reissued Feb. 15, 1916.

Original No. 1,125,917, dated January 19, 1915, Serial No. 843,922. Application for reissue filed January 6, 1916. Serial No. 70,675.

*To all whom it may concern:*

Be it known that I, THOMAS H. SYMINGTON, a citizen of the United States of America, residing at the city of Rochester, county of Monroe, State of New York, have invented certain new and useful Improvements in End Construction, of which the following is a specification.

The invention relates to means for connecting draft gears to wooden center sill cars.

The replacement of antiquated and worn-out draft gears on wooden center sill cars is at present a very important item in railway equipment, and the application of modern types of draft gears to such cars in a manner to enable them to withstand the tremendous buffing and draft shocks due to the great increase in tractive power of locomotives and the corresponding increase in the weight of the train involves, as will be evident, many problems difficult of solution.

It has been the common practice to connect the draft gear side plates or cheek-plates to wooden members, called draft sills, that are connected to the under faces of the center sills, and these wooden draft sills, owing to the shrinkage of the wood and the constant strains placed upon the same by the movement of the gear, are often badly shattered and split and are thus liable to fail and permit the side plates to become loose. Also, as the draft gear is mounted below the sills, there is a tendency for the sills to give downward at the ends and break at the bolster.

To overcome this and other difficulties and provide a permanent and rigid means for securing the cheek plates to the wooden sills is the object of my invention. To this end, in the present instance, I provide two flat plates, known as draft plates, at each end of the car. These overlie the inner faces of the sills, being bolted to the sills so that their lower portions hang down below the sills. The cheek plates are secured to the depending portion of the draft plates, bolts being ordinarily used for this purpose. In the present instance, a beam built up of plates and angles or channels is preferably substituted for the old wooden bolster. The draft plates, referred to as carrying the cheek plates, are reinforced along the top and bottom edges of the cheek plates by means of angles or other stiffening members, and these angles, part or all of them, in the preferred form of the invention, as well as the plates themselves, which are notched or shouldered for this purpose, abut against the bolster; and at the front the top portion of the draft plate, which projects upward between the sills, abuts against the front cross-sill, portions of each of said plates preferably also extending under the front cross sill or end sill. At the rear, the draft plates extend over and beyond the bolster, being reinforced at the bolster to prevent breaking of the sills over the bolster as is the tendency of the former structures.

Preferably the cheek plates which receive the drawing and buffing stresses, are secured to the depending portion of the draft plates over the reinforcing members previously referred to, and the rivets or bolts pass through the draft plates, cheek plates and angle irons so that the whole structure is exceedingly rigid, durable and permanent and cannot be displaced except by the destruction of the entire under frame.

A draft gear construction applied to a wooden under frame by means of the device of my invention, is shown in the accompanying drawings, in which—

Figure 4:
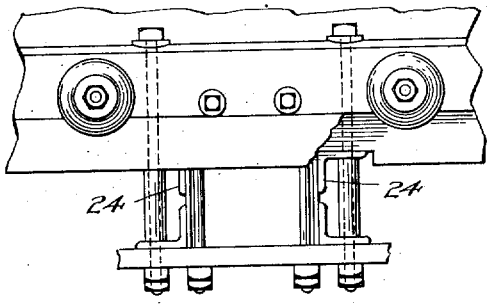
Figure 5:
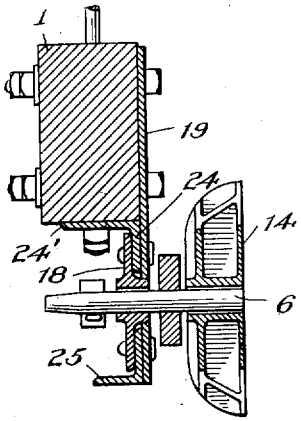
Figure 6:
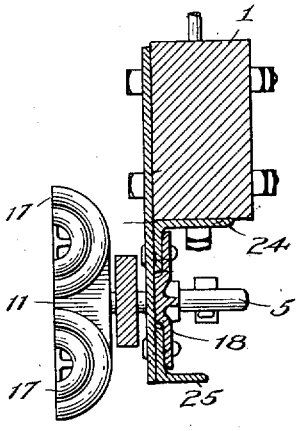

Figure 1 is a view half in plan and half in horizontal section on the line 1, 1 of Fig. 2; Fig. 2 is a vertical central cross-section; Fig. 3 shows a draft plate in elevation; Fig. 4 is a front view; and Figs. 5 and 6 are transverse sections, one on each side of the central longitudinal vertical plane, taken on the lines 5 and 6 respectively of Fig. 1.

Having reference to the drawings by means of characters applied to the different parts, the under frame is shown fragmentarily as consisting of center sills 1, running longitudinally of the car on each side of the center about a foot apart, a front cross-sill 2 and a bolster 3 beneath the sills secured thereto and extending from side to side of the car.

While the construction which is the subject of the invention may be used in connection with any preferred form of draft gear, in the present instance it is shown as applied to a three-key link draft gear of the Farlow type, having three cross-keys 4, 5 and 6, the front one being seated in a slot 7 in the drawbar 8 and normally occupying the centers of slots 9 in the cheek plates and extending through slots 10 in the forward ends of the links. The second key carries the front follower 11 and passes through the middle slots 12 in the links and 13 in the cheek plates. The rear key carries the rear follower 14 and passes through the rear slots 15 in the links and 16 in the cheek plates. Between the followers is the usual spring or other shock-absorbing means 17.

The draft plates 19 which are of a width exceeding the width of the sills to a considerable extent, are secured to and overlap the inner faces of the sills at the front and rear ends of the car so that the lower portions of the draft plates extend well below the sills. The cheek plates 18 are secured to the depending portions of the draft plates beneath the sills, the draft plates in the form of the invention shown, being slotted at 20 to admit the flanged portions 21 which surround the slotted openings in the cheek plates. Above and below the slotted openings are stiffening members 24 and 25, see particularly Figs. 5 and 6. These are in the form of angle irons and extend in a horizontal direction and are preferably interposed between the cheek plates 18 and the draft plates 19, the upper angle iron 24 having a flange 24′ secured to the bottom of the sill. As shown, the member 24 is the longer, and abuts at its rear end against the bolster 3. The draft plates and incidentally the angle irons, 24 and 25, are tied together by means of a tie-plate 26 shown as provided with end flanges, the latter each having two bolts, which pass through the lower portion of the draft plates and the lower angle irons.

At the forward end, each draft plate has secured to it an angle plate 27 which bears against the end sill 2. The depending portions of the draft plates terminate, as shown, with a vertical shoulder 28 just forward of and in contact with the front edge of the bolster. The upper stiffening bars or angle irons, 24, also terminate at this point, but the upper portion of the draft plate extends well to the rear, over the top of the bolster, being secured throughout its length to the sill. The draft plate is reinforced at the bolster by means of a cover plate 29 which affords a seating surface for the heads of the bolts which pass through the wooden sills, stiffens the draft plate and resists the downward bending movement in buffing. Each cover plate 29 extends forwardly of the bolster and overlaps the end of the corresponding stiffening member 24. Thus the draft plates which carry the cheek plates are rigidly secured at the front and rear so that they have a thrust against the front sill in drawing and against the bolster in buffing. They are further stiffened at the points of greatest stress by means of the angle irons 24 and 25 and the upper angles abut at their rear ends against the bolster so that the buffing stresses, which are the heaviest stresses to which the draft gear is subjected, are transmitted directly to the bolster by way of rigid members amply sufficient to receive and resist them, and the tendency which formerly existed to bend the forward ends of the sills down and break them in buffing is completely overcome.

The drawing stresses, which are less in magnitude, are fully taken care of by the direct thrust against the cross-sills as well as by the rigid attachment of the whole top portions of the plate, directly to the inner face of the wooden sills.

I have thus described my invention specifically and in detail so that its nature and the manner of using it may be fully understood by those skilled in the art. However, the specific terms herein are used in their descriptive rather than in their limiting sense and the scope of the invention is defined in the claims.

I claim:

1. In a center construction the combination with the center-sills, end-sill and bolster, of a pair of draft plates attached to the center sills and extending over the said bolster and under the end sill, a portion of each plate extending downwardly beyond the center sills, each of said portions being provided with a reinforcing flanged member overlying and secured to the corresponding draft plate and abutting the under face of the corresponding center sill.

2. A draft gear construction comprising center sills and end sills, draft plates connected to the vertical faces of the center sills and extending under the end sill, each plate being provided with a portion extending downwardly beyond the corresponding center sill, a reinforcing member connected to the said portion, said member having portions extending at an angle to each other to provide an outwardly extending flange, the said plate having portions lying on opposite sides of the said flange and intermediate of the ends of said reinforcing member, the said reinforcing member being connected to the corresponding center sill.

3. In a center construction consisting of wooden center sills, an end sill and a bolster, draft plates connected to the vertical faces of said center sills and extending over and to the rear of the bolster, each of said plates having a depending portion, cheek plates overlying and in engagement with and respectively secured to said depending portions, a reinforcing member connected to each depending portion, said member having a flange connected to the adjacent center sill and extending toward the bolster, and reinforcing means overlapping said reinforcing member and connected to said plate adjacent said bolster, said reinforcing means extending vertically toward the upper edge of said draft plate.

4. In a center construction and in combination with the end sill, center sills and bolster of a pair of draft plates connected to the inner faces of the center sills and extending under the end sill and over the body bolster, a portion of each of said plates depending below the center sills, and stiffening means overlying and connected to the outer faces of the depending portions of said plates and involving a plurality of flanges, each of said plates having portions lying on opposite sides of one of the flanges and intermediate of the ends of the corresponding stiffening means, one of the flanges of each of said means being in contact with and connected to the adjacent sill.

5. A draft gear construction consisting of depending draft plates secured to the inner faces of the sills, parallel angle irons secured to the outer faces of the plates beneath the sills, having one flange horizontal, the horizontal flange of the upper angle iron being secured to the bottom of the sill, cheek plates overlying the vertical flanges of the angle irons and fastened to both the angle irons and the draft plates.

6. A center construction consisting of wooden center sills, an end sill and a bolster, draft plates secured to the inner faces of the center sills each having a depending portion below the sills, the rear ends of the plates abutting against the bolster and the front ends against the end sill, cheek plates secured to the draft plates beneath the sills and horizontal reinforcing members in the form of angle irons secured to the top and bottom edges respectively of the depending portion of each draft plate, the upper angle irons having horizontal flanges secured to the bottoms of the draft sills.

7. A center construction consisting of wooden center sills, an end sill and a bolster, draft plates secured to the inner faces of the center sills and extending below the sills, the rear ends of the plates abutting against the bolster and the front ends against the end sill, cheek plates secured to the draft plates beneath the sills, reinforcing bars between the cheek plates and the draft plates, part of the reinforcing bars as well as the draft plates themselves, abutting against the bolster.

8. A center construction consisting of wooden center sills, an end sill and a bolster, draft plates secured to the inner faces of the center sills and extending below the sills, the rear portions of the plates abutting against the bolster and the front ends against the end sill, cheek plates secured to the draft plates beneath the sills, reinforcing members in the form of parallel angle irons having vertical flanges extending between the cheek plates and the draft plates and secured to both, the upper members having horizontal flanges secured to the bottoms of the draft sills and abutting at their rear ends against the bolster.

9. A center construction consisting of wooden center sills, an end sill and a bolster, draft plates secured to the inner faces of the center sills and extending below the sills, the rear portions of the plates abutting against the bolster and the front ends against the end sill, cheek plates secured to the draft plates beneath the sills, reinforcing members in the form of parallel angle irons having vertical flanges extending between the cheek plates and the draft plates and secured to both, the upper members having horizontal flanges secured to the bottoms of the draft sills and abutting at their rear ends against the bolster, the cheek plates being slotted between the reinforcing members and having flanges at the edges of the sills extending through the draft plates which are correspondingly slotted.

In testimony whereof I affix my signature.

THOMAS H. SYMINGTON.